(12) United States Patent
Murase

(10) Patent No.: US 7,637,560 B2
(45) Date of Patent: Dec. 29, 2009

(54) UNDER-COVER MOUNTING STRUCTURE FOR AN INDUSTRIAL VEHICLE

(75) Inventor: Takashi Murase, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 246 days.

(21) Appl. No.: 11/453,152

(22) Filed: Jun. 13, 2006

(65) Prior Publication Data

US 2006/0283914 A1 Dec. 21, 2006

(30) Foreign Application Priority Data

Jun. 14, 2005 (JP) .......................... P2005-173775

(51) Int. Cl.
*B60J 7/00* (2006.01)
(52) U.S. Cl. .............................. 296/193.07; 296/193.05
(58) Field of Classification Search ............ 296/193.07, 296/193.04, 193.05
See application file for complete search history.

(56) References Cited

U.S. PATENT DOCUMENTS

| RE18,573 E | * | 8/1932 | Kocher ........................ 52/402 |
| 4,420,062 A | * | 12/1983 | Fukushima .................. 181/204 |
| 4,783,122 A | * | 11/1988 | Komohara ................... 297/468 |
| 4,836,600 A | * | 6/1989 | Miyazaki et al. ....... 296/193.07 |
| 4,836,738 A | * | 6/1989 | Nozaka et al. ......... 296/190.03 |
| 4,898,417 A | * | 2/1990 | Kudo ....................... 296/97.23 |
| 5,743,341 A | * | 4/1998 | Wattonville ................. 172/451 |
| 6,733,067 B1 | * | 5/2004 | Miskech et al. .......... 296/183.1 |
| 6,811,210 B2 | * | 11/2004 | Granger et al. ......... 296/193.05 |
| 6,899,195 B2 | * | 5/2005 | Miyasaka ................... 180/312 |
| 6,973,986 B2 | * | 12/2005 | Murase ...................... 180/68.5 |
| 7,140,642 B2 | * | 11/2006 | Ito et al. ..................... 280/834 |
| 7,140,674 B2 | * | 11/2006 | Miyoshi et al. ........ 296/193.05 |
| 7,168,757 B2 | * | 1/2007 | Futatsuhashi .......... 296/193.05 |

FOREIGN PATENT DOCUMENTS

| JP | 5-97066 | 4/1993 |
| JP | 6-8856 | 1/1994 |
| JP | 2000-43759 | 2/2000 |
| JP | 2000-79886 | 3/2000 |

OTHER PUBLICATIONS

European Search Report dated Jun. 29, 2007 issued by European Patent Office for application No. 06115094.2-1268.

* cited by examiner

*Primary Examiner*—Kiran B. Patel
(74) *Attorney, Agent, or Firm*—Locke Lord Bissell & Liddell LLP

(57) ABSTRACT

An under-cover mounting structure for an industrial vehicle includes right and left side-frames, and an under cover. The right and left side-frames face each other with an interval. The under cover is detachably mounted on the side frames by fixing means for covering a lower part of an area between the side frames. The under cover has right and left side-portions. At least one of the side-portions has a mounting inclined-surface formed by folding the under cover along a longitudinal direction thereof. At least one of the side frames has a mounted inclined-surface which faces the mounting inclined-surface of the under cover.

6 Claims, 5 Drawing Sheets

UNDER-COVER MOUNTING STRUCTURE FOR AN INDUSTRIAL VEHICLE

BACKGROUND OF THE INVENTION

The present invention relates to a structure for mounting an under cover for an industrial vehicle and in particular to the structure where the under cover is detachably mounted on a side frame of the industrial vehicle.

An industrial vehicle such as a forklift truck is provided with a pair of side frames facing each other with an interval from side to side. A device for drive system such as an engine or a torque converter is disposed between the side frames. This type of industrial vehicle often employs a structure for mounting an under cover for an industrial vehicle (hereinafter referred to as under-cover mounting structure) in which the under cover is used to cover the lower part of the area between the side frames, thereby to protect the device between the side frames. The under cover for the under-cover mounting structure normally employs a structure where the under cover is detachable from the lower parts of the side frames in view of convenience upon maintenance.

An under-cover mounting structure according to a prior art is shown in FIGS. 4 and 5. In this under-cover mounting structure, right and left side frames 71 face each other with an interval, and an under cover 72 which covers the lower part of the area between the side frames 71 is detachably mounted on the side frames 71 by fixing bolts 76. An L-shaped bracket 75 is fixed to the inside of the lower part of each side frame 71 through the bolt 76. The under cover 72 has a pair of brackets 73 formed on the upper surface thereof and a pair of access holes 74 facing the corresponding brackets 73. The bolts 76 are inserted into the brackets 73 through the access holes 74 thereby to fix the brackets 73 to the L-shaped brackets 75 through the corresponding bolts 76, respectively (Refer to Japanese Unexamined Patent Application Publication (KO-KAI) No. 6-8856).

However, since there exists a sufficient gap between each side frame and the under cover in the under-cover mounting structure according to the prior art, chances are large that a foreign body such as dust or moisture enters the area between the side frames through the gap. In addition, it is easy for noise sounded by the device disposed in the area between the side frames to leak out of the area through the gap. Furthermore, when the under cover is mounted on the side frames in the prior art structure, it is necessary to accurately position each bracket and the corresponding L-shaped bracket to each other for insertion and screwing of the bolts. That is, unless the side frames and the under cover are simultaneously positioned in vertical, longitudinal and lateral directions, it is hard to insert and screw the bolts into the corresponding brackets. Furthermore, operation that the under cover is mounted on or detached from the side frames using the bolts needs to be performed through relatively narrow access holes. Thus, it is complicated that the under cover is mounted on or detached from the side frames using the bolts, which gives an operator a lot of trouble.

The present invention is directed to an under-cover mounting structure for an industrial vehicle which not only prevents a foreign body from entering an area between side frames through a gap between each side frame and the under cover but also simplifies mounting the under cover on the side frames and detaching the under cover from the side frames than ever before.

SUMMARY OF THE INVENTION

An under-cover mounting structure for an industrial vehicle according to the present invention includes right and left side-frames, and an under cover. The right and left side-frames face each other with an interval. The under cover is detachably mounted on the side frames by fixing means for covering a lower part of an area between the side frames. The under cover has right and left side-portions. At least one of the side-portions has a mounting inclined-surface formed by folding the under cover along a longitudinal direction thereof. At least one of the side frames has a mounted inclined-surface which faces the mounting inclined-surface of the under cover.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
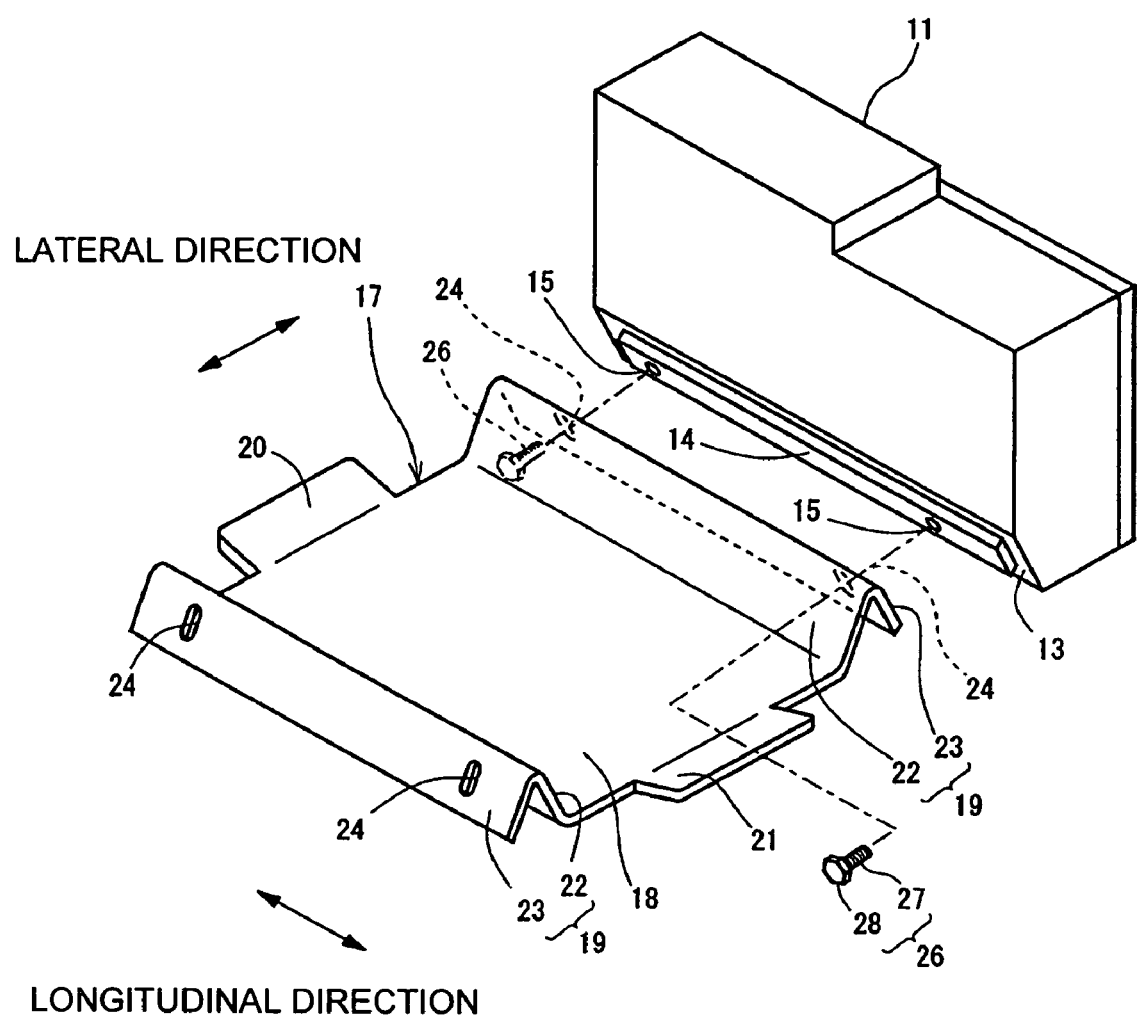
FIG. 1 is a perspective view showing an under-cover mounting structure which is taken apart according to a first embodiment of the present invention.
Figure 2:
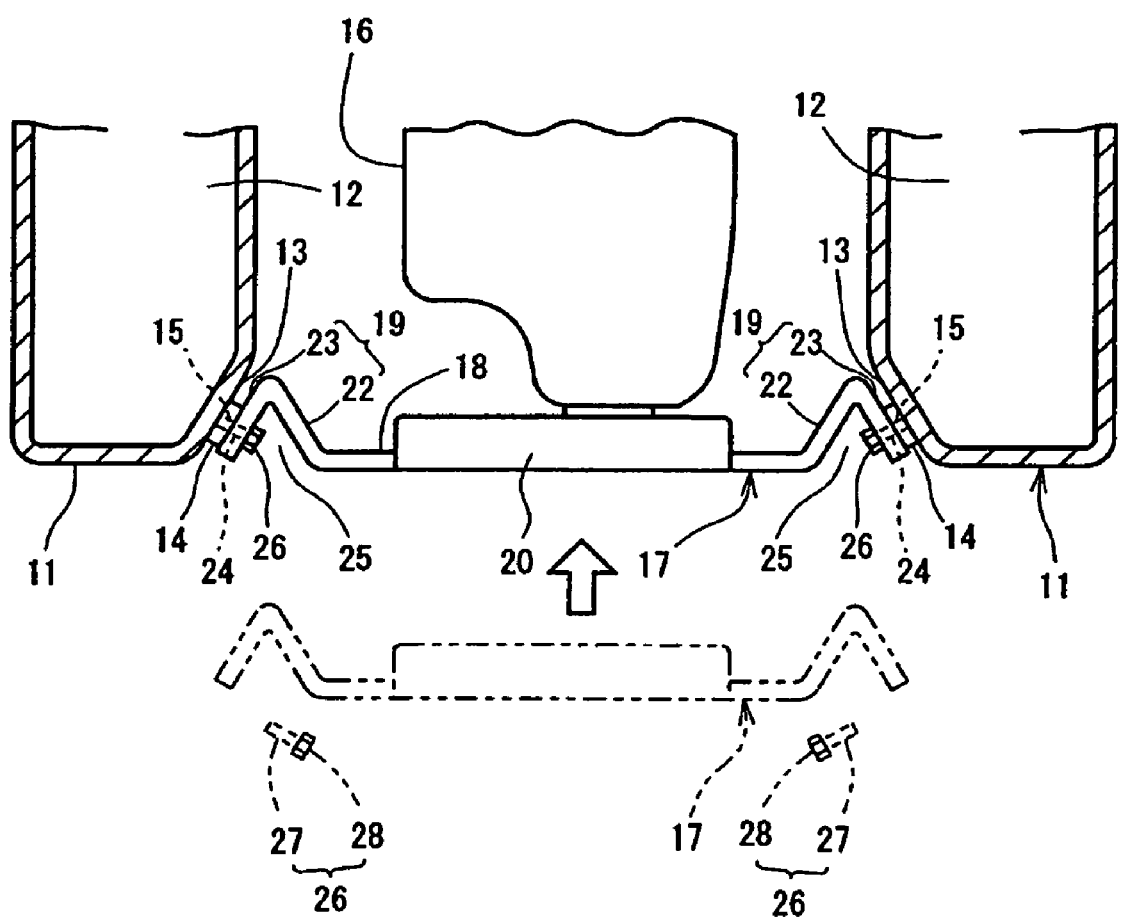
FIG. 2 is a front view showing the under-cover mounting structure according to the first embodiment of the present invention.

The following will describe an under-cover mounting structure for an industrial vehicle (hereinafter referred to merely as under-cover mounting structure) according to a first embodiment of the present invention with reference to FIGS. 1 and 2. The under-cover mounting structure of the first embodiment is applied to a forklift truck that serves as an industrial vehicle. FIG. 1 is a perspective view showing the under-cover mounting structure which is taken apart. FIG. 2 is a front view showing the under-cover mounting structure. The under-cover mounting structure of the first embodiment includes right and left side frames 11, right and left brackets 14 fixed to the side frames 11, respectively, an under cover 17 mounted on the side frames 11, and fixing bolts 26 for fixing the under cover 17 to the side frames 11, respectively. Each of the fixing bolts 26 serves as fixing means.

A vehicle frame for a forklift truck is provided with the right and left side frames 11, 11 facing each other with an interval (only the right side frame 11 is shown in FIG. 1). Each of the side frames 11 has a space 12 formed therein as shown in FIG. 2. A tank such as a fuel tank or oil tank, equipment or so forth (not shown) is disposed in the space 12. A device for drive system 16 such as an engine or a torque converter is mainly disposed in an area between the right and left side frames 11.

Connecting members (not shown) are located in front of and in the rear of the side frames 11 to connect the side frames 11. The connecting members and the side frames 11 form the vehicle frame. Each side frame 11 has an inclined portion 13 which is formed so as to diagonally traverse the lower surface and the inner side surface of the side frame 11 along the longitudinal direction of the side frame 11. A bracket 14 is fixed to the inclined portion 13 by welding for mounting the under cover 17 on the side frame 11.

The bracket 14 is an element included in the side frame 11. The bracket 14 is a slender plate which substantially corresponds to the longitudinal direction of the inclined portion 13. The surface of the bracket 14 is located parallel to the inclined surface 13. In the present embodiment, the surface of the bracket 14 corresponds to a mounted inclined-surface. If the inclined portion 13 of the side frame 11 serves as the mounting bracket 14, the bracket 14 does not need to be fixed to the side frame 11. In this case, the inclined portion 13 corresponds to the mounted inclined-surface. The surface of the bracket 14 is provided with front and rear holes 15. Each hole 15 is provided by an internal screw into which the corresponding bolt 26 is screwed in mounting the under cover 17 on the bracket 14.

The under cover 17 will now be described. The under cover 17 covers the lower part of the area between the side frames 11 thereby to protect the device 16 disposed between the side frames 11. The under cover 17 of the present embodiment is provided by fusing and folding a metallic plate. The under cover 17 has a horizontal portion 18 which occupies most of the under cover 17, right and left side portions 19 each of which serves as a side portion of the under cover 17, and extending portions 20, 21 that extend from the front and rear ends of the horizontal portion 18, respectively. The horizontal portion 18 is provided by a flat surface thereby to isolate the device 16 between the side frames 11 from outside.

The side portion 19 is provided by folding the under cover 17 along the longitudinal direction thereof twice. As the under cover 17 is seen from the front side thereof, it shows a notched shape. The side portion 19 has an inner inclined-portion 22 that extends from the horizontal portion 18 so as to be inclined upward, and an outer inclined-portion 23 that extends from the upper end of the inner inclined-portion 22 so as to be inclined downward. The upper surface of the outer inclined-portion 23 corresponds to a mounting inclined-surface. In the state where the under cover 17 is mounted on the side frame 11, the upper surface of the outer inclined-portion 23 faces the surface of the bracket 14 that corresponds to the mounted inclined-surface and at the same time the upper surface of the outer inclined-portion 23 is brought into contact with the surface of the bracket 14 substantially closely. Thus, angle of inclination of the outer inclined-portion 23 corresponds to that of the inclined portion 13 of the side frame 11. The outer inclined-portion 23 is an element for vertically and laterally positioning the under cover 17 relative to the side frame 11 using the surface of the bracket 14. It is noted that in the specification each of "mounting inclined-surface" and "mounted inclined-surface" also means "inclined surface" for use in positioning or mounting the under cover 17 relative to the side frame 11.

The outer inclined-portion 23 is provided with front and rear through-holes 24 bored. Each through hole 24 is a slot and major axis in the lengthwise direction of the slot corresponds to a direction of inclination of the outer inclined-portion 23. That is, it can be said that although the lengthwise direction of the through hole 24 is inclined relative to the under cover 17, the lengthwise direction of the through hole 24 corresponds to the lateral direction of the under cover 17. The through hole 24 enables the hole 15 to face the through hole 24 even if the under cover 17 is not securely positioned to the bracket 14 in mounting the under cover 17 on the bracket 14. A space 25 is provided on the downside of the side portion 19 by the inner inclined-portion 22 and the outer inclined-portion 23. The space 25 is an element for facilitating operation for screwing or removing the bolt 26 using tool. The bolt 26 used in the present embodiment includes a shaft portion 27 having an external thread formed thereon and a head portion 28 formed on one end of the shaft portion 27.

The extending portion 20 is inclined slightly upward from the front end of the horizontal portion 18 by bending. The extending portion 20 is plate-like, which prevents a foreign body from entering an area on the under cover 17 from before and facilitates overcoming of obstacles on the surface of a road during running of the vehicle. Meanwhile, the extending portion 21 is also inclined slightly upward from the rear end of the horizontal portion 18 by bending. The extending portion 21 is plate-like, which prevents the foreign body from entering the area on the under cover 17 from the rear and facilitates overcoming of obstacles on the surface of a road during backward running of the vehicle.

Now, mounting the under cover 17 on the side frames 11,11 according to the present embodiment will be described. First of all, the under cover 17 is horizontally disposed below the right and left side-frames 11 so as to face the right and left side-frames 11. Then, the under cover 17 is raised toward the side frames 11, thereby to bring the right and left outer inclined-portions of the under cover 17 into contact with the surfaces of the brackets 14 of the side frames 11. When the outer inclined-portion 23 and the surfaces of the brackets 14 are in contact with each other, the under cover 17 is laterally and vertically positioned to the side frames 11. Since at this time the holes 15 of each bracket 14 are visible from the corresponding through holes 24, the corresponding bolts 26 are inserted into the through holes 24 from beneath and then screwed into the corresponding holes 15.

The space 25 provided by the inner inclined-portion 22 and the outer inclined-portion 23 facilitates screwing of the bolt 26 in screwing the bolt 26 into the hole 15. When the screwed bolt 26 is fastened to the hole 15, the under cover 17 is completely mounted on the side frame 11. Since the head portion 28 of the fastened bolt 26 is positioned higher than the lowermost surface of the under cover 17, for example, chances are prevented that a projection on the surface of the road directly collides with the head portion 28 of the bolt 26. In the state where the under cover 17 is mounted on the side frame 11, the surface of the bracket 14 and the outer inclined-portion 23 of the under cover 17 are in contact with each other substantially closely.

The through hole 24 of the under cover 17 is so formed that the hole 15 is visible from the through hole 24 even if the under cover 17 is incompletely positioned to the side frame 11 in the vertical direction thereof in mounting the under cover 17 on the side frame 11. Therefore, the under cover 17 is temporarily held onto the side frame 11 by temporarily holding the bolt 26 into its hole 15, and the under cover 17 is then positioned in a suitable position using the axial force of the bolt 26 in fastening the bolt 26 to the side frame 11, thereby to fix the under cover 17 to the side frame 11. In addition, the through hole 24 provided by a slot absorbs dimensional error in the lateral direction of the side frame 11 and the under cover 17 in using the bolt 26, which enables the under cover 17 to be mounted on the side frame 11.

The under-cover mounting structure according to the present embodiment has the following beneficial effects.

(1) Since the mounting inclined-surface included in the side portion 19 is brought into contact with the mounted inclined-surface of the side frame 11, there is not a large gap between the side frame 11 and the under cover 17. Therefore, the foreign body is prevented from being entered into the area between the side frames 11 through the gap between the side frame 11 and the under cover 17. In addition, since there is not a large gap between the side frame 11 and the under cover 17, noise sounded by the device 16 between the side frames 11 is hardly leaked out of the area between the side frames 11.

(2) When the under cover 17 is mounted on the side frame 11, the under cover 17 is raised, for example, in the state where the mounting inclined-surface of the under cover 17 is in contact with the mounted inclined-surfaces of the side frame 11, thereby to position the under cover 17 to the side frame 11 simultaneously in the vertical and lateral directions. Therefore, the under cover 17 is easily mounted on the side frame 11.

(3) Since the bolt 26 is screwed into the hole 15 from downside of the under cover 17 to mount the under cover 17 on the side frame 11, for example, it is possible to remove only the under cover 17 in performing maintenance of the vehicle compared to the conventional case where the bolt is used from side of the area between the side frames to mount the under cover on the side frames.

(4) Even if the under cover 17 is not accurately positioned to the side frame 11 in the vertical direction thereof in mounting the under cover 17 on the side frame 11, the through hole 24 can be arranged so as to face the hole 15. Therefore, for example, the bolt 26 is temporarily held into its hole 15 and the axial force of the screwed bolt 26 is used thereby to position and fix the under cover 17 to the side frame 11.

(5) The mounting inclined-surface positions the under cover 17 together with the mounted inclined-surface. In addition, the mounting inclined-surface is directly brought into contact with the mounted inclined-surface by the bolt 26. Therefore, the contact between the mounting inclined-surface and the mounted inclined-surface is reinforced thereby to further prevent the gap between the side frame 11 and the under cover 17, which especially prevents the foreign body from entering the area between the side frames 11.

(6) Since the head portion 28 of the bolt 26 is positioned higher than the lowermost surface of the under cover 17, the collision between the head portion 28 of the bolt 26 and the foreign body or obstacle during running of the vehicle is prevented.

(7) Since the under cover 17 is formed by fusing, folding and slightly boring the metallic plate, the under cover 17 is easily formed compared to the conventional under cover. In addition, not only the number of parts for the under cover 17 but also the number of parts needed for mounting the under cover 17 on the side frames 11 is drastically reduced. Furthermore, working time is shortened.

An under-cover mounting structure according to a second embodiment of the present invention will now be described with reference to FIG. 3A, which is a partial front view showing the under-cover mounting structure according to the second embodiment. For the sake of explanatory convenience, the second embodiment is common to the first embodiment in the bolt 26, the bracket 14 and the hole 15 each of which serves as fixing means.

Figure 3A:
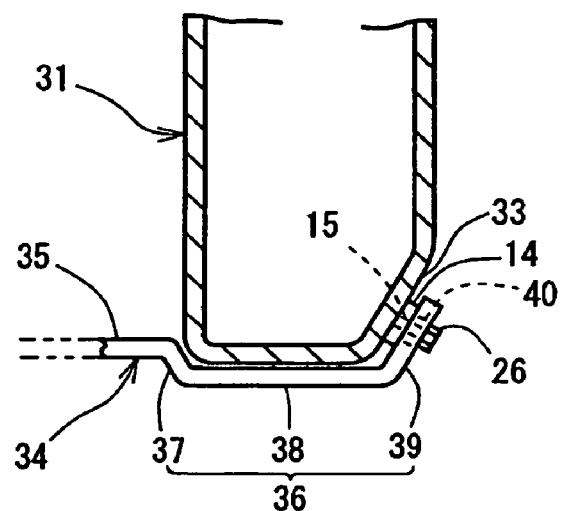
FIG. 3A is a partial front view showing an under-cover mounting structure according to a second embodiment of the present invention.

In the present embodiment inclined portions 33 of right and left side frames 31 (only the right side frame 31 is shown in FIG. 3A) are formed so as not to face the inside of the side frames 31, 31 but to face the outside thereof. The bracket 14 having the hole 15 formed therein is fixed to the inclined portion 33. The surface of the bracket 14 corresponds to the mounted inclined-surface. Meanwhile, right and left side portions 36 of an under cover 34 are each provided by folding the under cover 34 along the longitudinal direction thereof three times. Each side portion 36 has an inner inclined-portion 37 that extends from a horizontal portion 35 of the under cover 34 to the slightly lower outside thereof, a horizontal side portion 38 that horizontally extends from the inner inclined-portion 37 to the outside thereof, and an outer inclined-portion 39 that extends from the horizontal side portion 38 to the slightly upper outside thereof.

The horizontal side portion 38 is located along the lower part of the side frame 31. The outer inclined-portion 39 has angle of inclination which corresponds to that of the inclined-portion 33, and has a through hole 40 provided by a slot. The upper surface of the outer inclined-portion 39 corresponds to the mounting inclined-surface. The lengthwise direction of the through hole 40 corresponds to a lateral direction of the under cover 34. Therefore, when the under-cover 34 is mounted on the side frame 31, the hole 15 is visible from the side of the side frame 31 through the through hole 40. In the state where the under cover 34 is mounted on the side frame 31, the side portion 36 covers the lower part of the side frame 31.

The under-cover mounting structure of the second embodiment has the effects equal to or similar to that of the first embodiment. In addition, since the side portion 36 of the under cover 34 reaches the outside of the side frame 31, chances are extremely small that the foreign body enters the area between the side frames 31 through the gap between the side frames 31 and the under cover 34. Since the hole 15 is visible from the side of the side frame 31 through the through hole 40 in mounting the under cover 34 on the side frame 31, it is easy to check the through hole 40 and the hole 15 from the side of the side frame 31. Since the side portion 36 covers the lower part of the side frame 31, the lower part of the side frame 31 can be protected by the under cover 34. Since the space needed for handling the bolt 26 is not specially restricted but is sufficiently secured, it is easy to mount the under cover 34 on the side frame 31 or remove the under cover 34 from the side frame 31.

An under-cover mounting structure according to a third embodiment of the present invention will now be described with reference to FIG. 3B, which is a partial front view showing the under-cover mounting structure according to the third embodiment. For the sake of explanatory convenience, the third embodiment is common to the first embodiment in the bolt 26, the bracket 14 and the hole 15 each of which serves as fixing means.

Figure 3B:
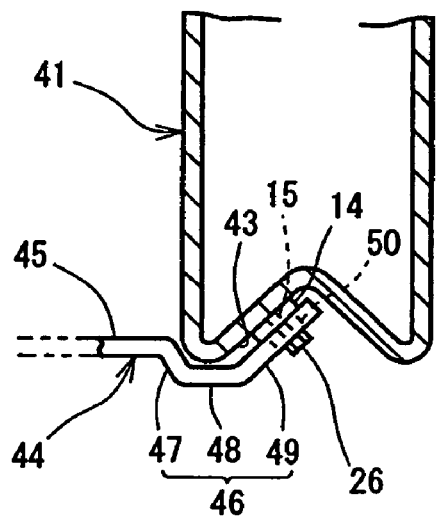
FIG. 3B is a partial front view showing an under-cover mounting structure according to a third embodiment of the present invention.

In the present embodiment lower surfaces of right and left side frames 41 (only the right side frame 41 is shown in FIG. 3B) are formed so as to upward become hollow in a notched shape. One surface for partially forming the notched shape of the lower surface (or an inside element of the lower part of the side frame 41 in FIG. 3B) is an inclined portion 43. The bracket 14 having the hole 15 formed therein is fixed to the inclined portion 43. The surface of the bracket 14 corresponds to the mounted inclined-surface. Meanwhile, right and left side portions 46 of an under cover 44 are each provided by folding the under cover 44 along the longitudinal direction thereof three times. In a similar manner to the second embodiment, the side portion 46 has an inner inclined-portion 47 that extends from a horizontal portion 45 of the under cover 44 to the slightly lower outside thereof, a horizontal side portion 48 that horizontally extends from the inner inclined-portion 47 to the outside thereof, and an outer inclined-portion 49 that extends from the horizontal side portion 48 to the slightly upper outside thereof. The outer inclined-portion 49 has angle of inclination which corresponds to that of the inclined-portion 43, and has a through hole 50 provided by a slot. The upper surface of the outer inclined-portion 49 corresponds to the mounting inclined-surface.

The under-cover mounting structure of the third embodiment has the effects equal to or similar to that of the first embodiment. In addition, since the side portion 46 of the under cover 44 reaches substantially the middle of the lower part of the side frame 41 and the other surface for partially forming the notched shape of the lower part of the side frame 41 (or an outside element of the lower part of the side frame 41 in FIG. 3B) is located adjacent to the end of the outer inclined-portion 49, chances are extremely small that the foreign body enters the area between the side frames 41 through the gap between the side frames 41 and the under cover 44.

An under-cover mounting structure according to a fourth embodiment of the present invention will now be described with reference to FIG. 3C, which is a partial front view showing the under-cover mounting structure according to the fourth embodiment. For the sake of explanatory convenience, the fourth embodiment is common to the first embodiment in the bolt 26, the bracket 14 and the hole 15 each of which serves as fixing means.

Figure 3C:
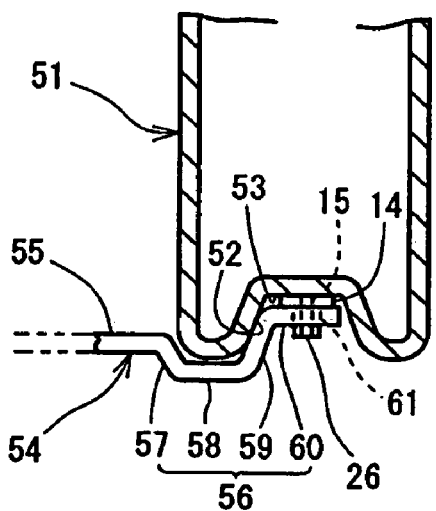
FIG. 3C is a partial front view showing an under-cover mounting structure according to a fourth embodiment of the present invention.
Figure 4:
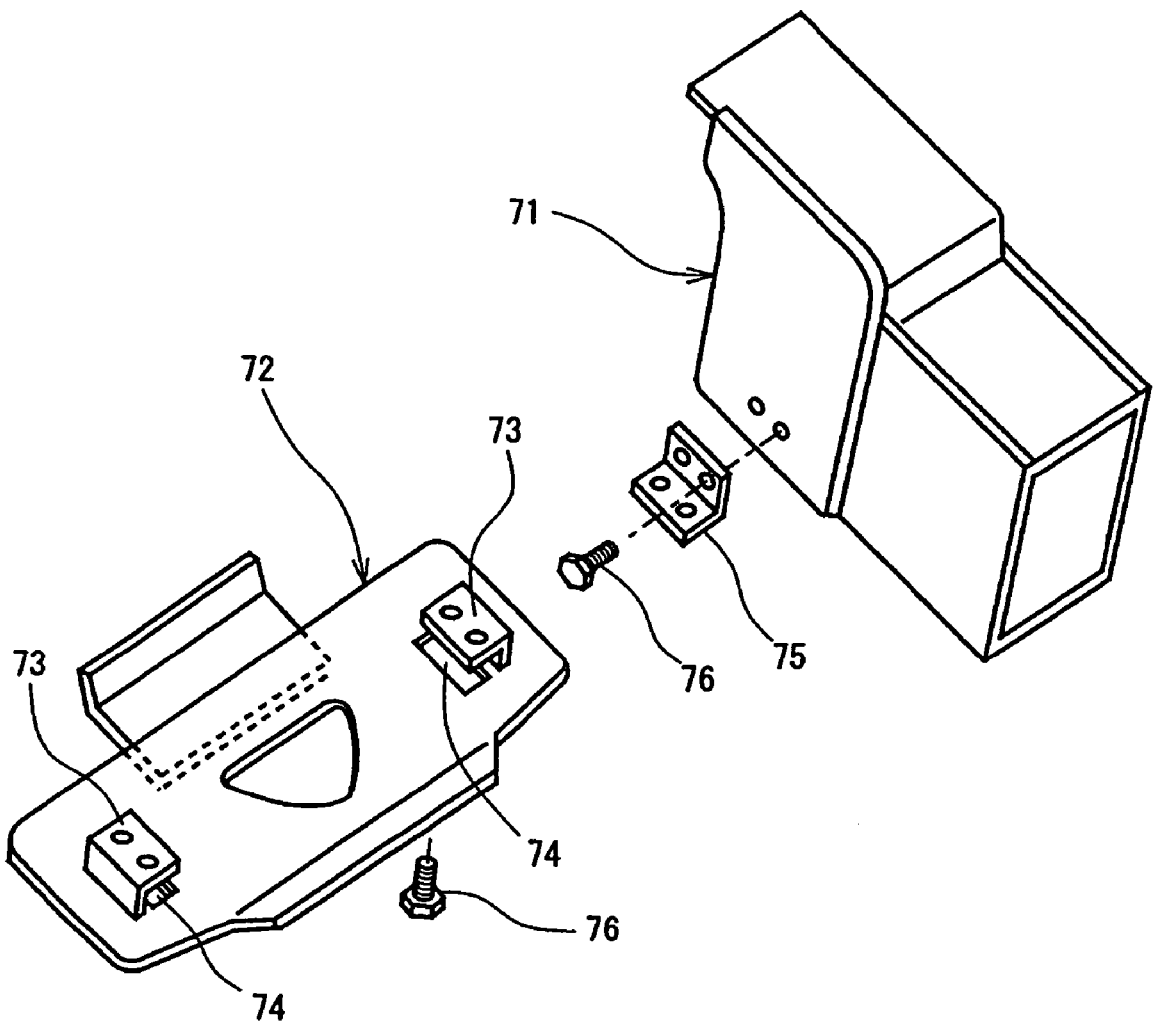
FIG. 4 is a perspective view showing an under-cover mounting structure which is taken apart according to a prior art.
Figure 5:
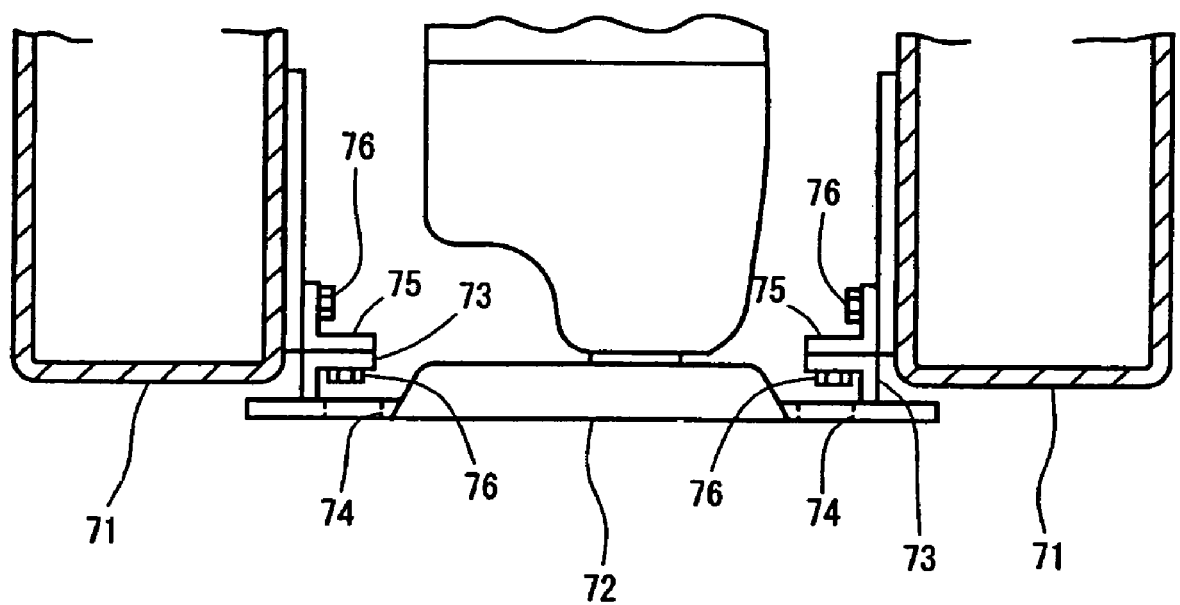
FIG. 5 is a front view showing the under-cover mounting structure according to the prior art.

In the present embodiment lower surfaces of right and left side-frames 51 (only the right side frame 51 is shown in FIG. 3C) are formed so as to upward become hollow in a recessed shape. One surface for partially forming the recessed shape of the lower surface (or an inside element of the lower part of the side frame 51 in FIG. 3C) is an inclined portion 52. A horizontal surface 53 is included in the lower surface for forming the recessed shape of the side frame 51. The bracket 14 is fixed to the horizontal surface 53. The surface of the bracket 14 corresponds to the mounted inclined-surface.

Meanwhile, right and left side-portions 56 of an under cover 54 are each provided by folding the under cover 54 along the longitudinal direction thereof four times. Each side portion 56 has an inner inclined-portion 57 that extends from a horizontal portion 55 of the under cover 54 to the slightly lower outside thereof, a horizontal side portion 58 that horizontally extends from the inner inclined-portion 57 to the outside thereof, an outer inclined-portion 59 that extends from the horizontal side portion 58 to the slightly upper outside thereof, and an outer horizontal-portion 60 that horizontally extends from the outer inclined-portion 59 to the outside thereof. The outer inclined-portion 59 has angle of inclination which corresponds to that of the inclined-portion 52. The upper surface of the outer inclined-portion 59 corresponds to the mounting inclined-surface. The outer horizontal-portion 60 of the under cover 54 has a through hole 61 provided by a slot. The lengthwise direction of the through hole 61 corresponds to a lateral direction of the under cover 54.

The under-cover mounting structure of the fourth embodiment has the effects equal to or similar to that of the first embodiment. In addition, since the side portion 56 of the under cover 54 reaches substantially the middle of the lower part of the side frame 51 and the other surface for partially forming the recessed shape of the lower part of the side frame 51 (or an outside element of the lower part of the side frame 51 in FIG. 3C) is located adjacent to the end of the outer inclined-portion 59, chances are extremely small that the foreign body enters the area between the side frames 51 through the gap between the side frames 51 and the under cover 54.

The present invention is not limited to the above first through fourth embodiments but may be variously modified within the scope of the invention. The modifications of the first though fourth embodiments are as follows.

Although in the first embodiment the right and left sides of the under cover are provided respectively with the mounting inclined-surfaces, any one of the right and left sides of the under cover may be provided with the mounting inclined-surface. It is preferable to provide another mounting means for the other of the right and left sides of the under cover where the mounting inclined-surface is not provided. In this case, it is hoped that the contact between the mounting inclined-surface on one side of the under cover and the mounted inclined-surface on the side frame prevents the foreign body from entering the area between the side frames.

Although in the first embodiment the right and left side-portions of the under cover are provided respectively with the mounting inclined-surfaces having the same shape, for example, one of the right and left side-portions of the under cover may be provided with the mounting inclined-surface of the first embodiment and the other of the right and left side-portions of the under cover may be provided with the mounting inclined-surface of the second embodiment. Thus, the under-cover mounting structures of the first through fourth embodiments may be appropriately combined together to form the side portion of the under cover and the inclined portion of the side frame.

Although in each of the above embodiments the side portion of the under cover needs to be provided by folding the under cover plural times, the under cover for the under-cover mounting structure according to the present invention may be formed by folding the under cover once or more than once. In this specification, when the under cover is folded, the crease of the under cover may be relatively clearly made, or gently made so as to include an arc as seen from the cross section of the under cover. When the crease of the under cover is gently made so as to include the arc, it is preferable that at least each of the mounting inclined-surface and the mounted inclined-surface is provided by a flat surface which forms a straight line as seen from the cross section of the under cover.

Although in the first embodiment the horizontal portion of the under cover is not provided with an opening, if the device for drive system disposed between the side frames needs to be adjusted or maintained, the horizontal portion of the under cover may be provided with an opening in a suitable position.

Although in the first through fourth embodiments the fixing bolt is used as the fixing means, the fixing means is not limited to the bolt. Appropriate means which at least enables fixation of the under cover to the side frames is employed.

Although the under-cover mounting structure of each of the first through fourth embodiments is applied to the forklift truck that serves as the industrial vehicle, the present invention may be applied not only to the forklift truck but also to a construction vehicle that serves as the industrial vehicle.

Therefore, the present examples and embodiments are to be considered as illustrative and not restrictive, and the invention is not to be limited to the details given herein but may be modified within the scope of the appended claims.

What is claimed is:

1. An under-cover mounting structure for an industrial vehicle, comprising:

right and left side frames facing each other and providing a separation interval therebetween; and an under cover detachably mounted on the side frames by fixing means, the under cover configured to cover a lower part of an area between the side frames, the under cover having right and left side-portions, at least one of the side-portions having a mounting surface formed by folding the under cover along a longitudinal direction thereof wherein at least one of the side frames has a mounted surface which faces the mounting surface of the under cover, the mounted surface extends along the longitudinal direction of the under cover, wherein the fixing means is a fixing bolt, the at least one side-portion of the under cover having a through hole through which the bolt is inserted, the corresponding side frame having a hole which faces the through hole, the bolt being freely screwed into the hole through the through hole from downside of the under cover, wherein the through hole is a slot, a lengthwise direction of the slot corresponding to a lateral direction of the under cover, wherein the mounting surface is a mounting inclined-surface which is brought into close contact with the mounted surface that is a mounted inclined-surface, along the entire longitudinal direction of the under cover to thereby isolate the area between the side frames from outside wherein the mounted inclined-surface is an inclined portion which is formed so as to diagonally traverse a lowermost surface and an inner side surface of the side frame along a longitudinal direction of the side frame, and wherein the lowermost surface of the side frame is level with that of the under cover.

2. The under-cover mounting structure according to claim 1, wherein the through hole is formed in the mounting inclined-surface.

3. The under-cover mounting structure according to claim 1, wherein the through hole and the hole are formed so that a head portion of the bolt is positioned higher than the lowermost surface of the under cover.

4. The under-cover mounting structure according to claim 1, wherein the side frame has a bracket whose surface is the mounted inclined-surface.

5. The under-cover mounting structure according to claim 1, wherein the side portion is formed by folding the under cover along a longitudinal direction thereof plural times.

6. The under-cover mounting structure according to claim 1, wherein the industrial vehicle is a forklift truck.

* * * * *